(12) United States Patent
Xi et al.

(10) Patent No.: US 10,296,138 B2
(45) Date of Patent: May 21, 2019

(54) ARRAY SUBSTRATE, DISPLAY PANEL, METHOD FOR DETERMINING TOUCH CENTER COORDINATES AND DISPLAY DEVICE

(71) Applicants: SHANGHAI AVIC OPTO ELECTRONICS CO., LTD., Shanghai (CN); TIANMA MICRO-ELECTRONICS CO., LTD., Shenzhen (CN)

(72) Inventors: Kerui Xi, Shanghai (CN); Huiping Chai, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/211,959

(22) Filed: Jul. 15, 2016

(65) Prior Publication Data

US 2017/0249050 A1 Aug. 31, 2017

(30) Foreign Application Priority Data

Feb. 29, 2016 (CN) .......................... 2016 1 0113240

(51) Int. Cl.
*G06F 3/041* (2006.01)
*G06F 3/044* (2006.01)
(52) U.S. Cl.
CPC ............ *G06F 3/0418* (2013.01); *G06F 3/044* (2013.01); *G06F 3/0412* (2013.01)

(58) Field of Classification Search
CPC ................. G06F 3/0418; G06F 3/0412; G06F 3/041–3/044; G06F 2203/04103; G09G 2330/08–2330/12
See application file for complete search history.

(56) References Cited

U.S. PATENT DOCUMENTS

2010/0007615 A1* 1/2010 Wu .................. G06F 3/0418
345/173
2012/0229395 A1* 9/2012 Shin ................. G06F 3/0418
345/173
(Continued)

FOREIGN PATENT DOCUMENTS

CN 103914176 A 7/2014
CN 104503110 A * 4/2015 ........... G06F 3/0416
(Continued)

*Primary Examiner* — Michael J Jansen, II
*Assistant Examiner* — Ivelisse Martinez Quiles
(74) *Attorney, Agent, or Firm* — Kilpatrick Townsend & Stockton, LLP

(57) ABSTRACT

An array substrate, a display panel, a method for determining touch center coordinates and a display device are provided. The array substrate includes: multiple touch electrodes arranged in an array, where the multiple touch electrodes include multiple touch electrode columns arranged in a first direction and multiple touch electrode rows arranged in a second direction. The array substrate also includes multiple touch leads, where each of the multiple touch leads is electrically connected to one of the multiple touch electrodes. The array substrate still includes multiple repair leads, where an insulation overlapped region is provided between each of two of the multiple touch leads corresponding to two adjacent ones of the multiple touch electrodes arranged in the first direction or the second direction and at least one of the multiple repair leads.

9 Claims, 5 Drawing Sheets

(56) References Cited

U.S. PATENT DOCUMENTS

| | | | |
|---|---|---|---|
| 2013/0016077 A1* | 1/2013 | Lin | G02F 1/136227 |
| | | | 345/204 |
| 2015/0185932 A1 | 7/2015 | Lu et al. | |
| 2016/0170544 A1* | 6/2016 | Wang | G06F 3/0416 |
| | | | 345/173 |
| 2016/0170560 A1* | 6/2016 | Zhan | G06F 3/0416 |
| | | | 345/174 |
| 2017/0185223 A1* | 6/2017 | Lu | G06F 3/0412 |

FOREIGN PATENT DOCUMENTS

| | | | |
|---|---|---|---|
| CN | 204595382 U | * | 8/2015 |
| DE | 102014108124 A1 | | 7/2015 |

\* cited by examiner

ARRAY SUBSTRATE, DISPLAY PANEL, METHOD FOR DETERMINING TOUCH CENTER COORDINATES AND DISPLAY DEVICE

CROSS REFERENCE OF RELATED APPLICATION

This application claims the priority to Chinese Patent Application No. 201610113240.1, entitled "ARRAY SUBSTRATE, DISPLAY PANEL, METHOD FOR DETERMINING TOUCH CENTER COORDINATES AND DISPLAY DEVICE", filed with the Chinese State Intellectual Property Office on Feb. 29, 2016, which is incorporated by reference in its entirety herein.

FIELD

The present disclosure relates to the field of touch display technology, and in particular to an array substrate, a display panel, a method for determining touch center coordinates and a display device.

BACKGROUND

At an initial stage of development of touch display technology, a touch panel is laminated with a display panel to form a touch display panel, so as to achieve touch display. In this case, the touch panel and the display panel need to be prepared separately, thereby resulting in a high cost, a great thickness and a low production efficiency.

With development of self-capacitive touch display integration technology, a common electrode layer of an array substrate in the display panel may be reused as a touch electrode layer for self-capacitive touch detection. By driving in a time-division manner, touch control and display control are performed in different timings, thereby achieving a touch function and a display function simultaneously. In this case, a touch electrode is directly integrated within the display panel, thereby greatly reducing a fabricating cost, improving a production efficiency, and reducing a panel thickness.

In a case of reusing the common electrode as the touch electrode, the common electrode layer needs to be divided into multiple separate common electrodes. In addition, in order to control touch and display in a time-division manner, each touch electrode is provided with a signal via a separate touch lead. Specifically, via the touch lead, the corresponding touch electrode is provided with a touch sensing signal during a touch phase, and is provided with a display driving voltage during a display phase. However, for an existing self-capacitive touch display device, in a case that a fault occurs in a touch lead, an abnormity in display and touch may take place in a region corresponding to a touch electrode connected to the touch lead, thereby shortening a service life of the display device.

SUMMARY

In view of the above, an array substrate, a display panel, a method for determining touch center coordinates and a display device are provided according to the present disclosure. Repair leads are provided on the array substrate. When a fault occurs in any touch lead, a touch electrode connected to the touch lead in the fault state is electrically connected to an adjacent touch electrode thereof via the repair lead, such that the two adjacent touch electrodes are used as a whole to perform display and touch, thereby extending a service life of the display device.

In order to achieve the above objects, following technical solutions are provided in the present disclosure.

An array substrate is provided, which includes multiple touch electrodes arranged in an array. The multiple touch electrodes include multiple touch electrode columns arranged in a first direction and multiple touch electrode rows arranged in a second direction. The array substrate further includes multiple touch leads, where each of the multiple touch leads is electrically connected to one of the multiple touch electrodes. The array substrate also includes multiple repair leads, where an insulation overlapped region is provided between each of two of the multiple touch leads corresponding to two adjacent ones of the multiple touch electrodes arranged in the first direction or the second direction and at least one of the multiple repair leads.

Accordingly, a display panel is further provided in the present disclosure, which includes the array substrate described above.

Accordingly, a method for determining touch center coordinates is further provided in the present disclosure, which is applicable to the display panel described above. In a case that a fault occurs in a touch lead corresponding to any one of two adjacent touch electrodes in the display panel, each of two touch leads corresponding to the two adjacent touch electrodes is electrically connected to a corresponding repair lead, with the two adjacent touch electrodes being defined as a repair touch electrode. The method includes acquiring a capacitance of the repair touch electrode; determining that the capacitance of the repair touch electrode is within a preset range of touch capacitances; defining, as changing touch electrodes, touch electrodes which are closer to the repair touch electrode in the first direction and the second direction and of which capacitances take changes, and acquiring a capacitance of each of the changing touch electrodes; and calculating, based on the capacitance of the repair touch electrode and the capacitance of the changing touch electrode, touch coordinates in the first direction and touch coordinates in the second direction, to determine the touch center coordinates.

Accordingly, a display device is further provided in the present disclosure, which includes the display panel described above.

As compared with the conventional technology, the technical solutions provided in the present disclosure have at least the following advantages.

An array substrate, a display panel, a method for determining touch center coordinates and a display device are provided in the present disclosure. The array substrate includes multiple touch electrodes arranged in an array. The multiple touch electrodes include multiple touch electrode columns arranged in a first direction and multiple touch electrode rows arranged in a second direction. The array substrate further includes multiple touch leads. Each of the multiple touch leads is electrically connected to one of the multiple touch electrodes. The array substrate further includes multiple repair leads. An insulation overlapped region is provided between each of two of the multiple touch leads corresponding to two adjacent ones of the multiple touch electrodes arranged in the first direction or the second direction and at least one of the multiple repair leads.

It can be seen from above that, with the technical solutions provided in the present disclosure, multiple repair leads are provided on the array substrate. In a case that a fault occurs in any touch lead, a touch electrode connected to the touch lead in the fault state is electrically connected to an adjacent touch electrode thereof via a repair lead, such that the two adjacent touch electrodes are connected as a repair touch electrode. The repair touch electrode is provided with a corresponding display signal during a display phase of the display device. During a touch phase of the display device, the touch center coordinates of the repair touch electrode are calculated with the method for determining touch center coordinates provided in the present disclosure, thereby guaranteeing normal use of the display device and extending the service life of the display device.

BRIEF DESCRIPTION OF THE DRAWINGS

In order to illustrate technical solutions in embodiments or in the conventional technology more clearly, drawings to be used in the description of the embodiments or the conventional technology are introduced simply hereinafter. Apparently, the drawings in the following description only illustrate the embodiment, and other drawings may be obtained by those skilled in the art based on the provided drawings without any creative labor.

FIG. 5b is a distribution diagram of capacitances of all touch electrodes in the touch structure of the display panel shown in FIG. 5a.

DETAILED DESCRIPTION OF THE EMBODIMENTS

Hereinafter technical solutions in the embodiments are described clearly and completely in conjunction with the drawings in the embodiments. Apparently, the described embodiments are only some rather than all of the embodiments. Any other embodiments obtained by those skilled in the art based on the embodiments without any creative labor fall within the scope of protection of the disclosure.

As described in the background, for the conventional self-capacitive touch display device, when a fault occurs in a touch lead, an abnormity in display and touch may take place in a region corresponding to a touch electrode connected to the touch lead, thereby shortening a service life of the display device.

Figure 1:
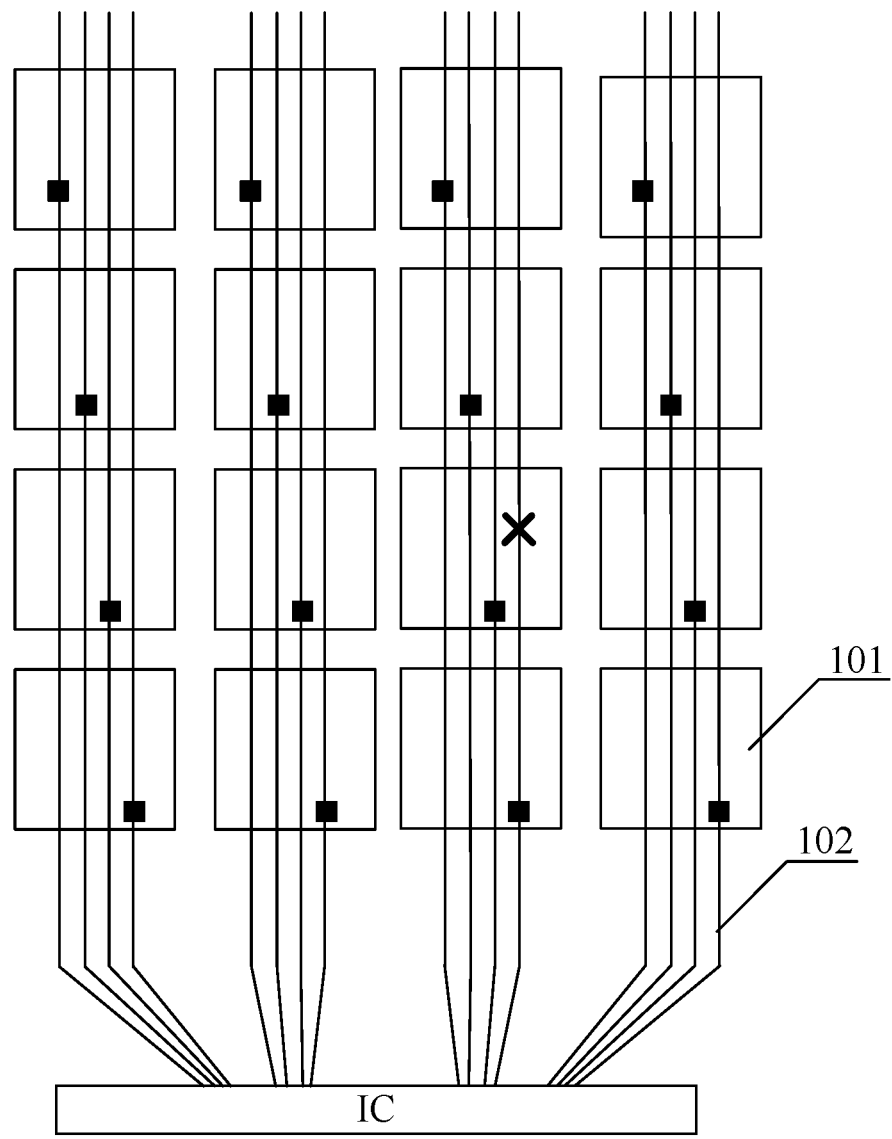
FIG. 1 is a schematic diagram of a touch structure of an array substrate according to the conventional technology.

Reference is made to FIG. 1, which is a schematic diagram of a touch structure of an array structure according to the conventional technology. In FIG. 1, a common electrode layer of the array substrate is divided into multiple separate common electrodes 101. The common electrodes are reused as touch electrodes. Each of the touch electrodes 101 is connected to a drive circuit IC via a corresponding touch lead 102 thereof. A touch sensing signal is output from the drive circuit IC and is transmitted to a touch electrode 101 corresponding to a touch lead 102 via the touch lead 102. When disconnection occurs in a touch lead connected to a touch electrode (for example, at a position indicated by "X" in FIG. 1), an abnormity in display and touch may take place in a region corresponding to the touch electrode connected to the touch lead, so that the display device cannot be used continuously, thereby shortening the service life of the display device.

In view of the above, an array substrate, a display panel, a method for determining touch center coordinates and a display device are provided according to embodiments. Repair leads are provided on the array substrate. When a fault occurs in any touch lead, a touch electrode connected to the touch lead in the fault state is electrically connected to an adjacent touch electrode thereof via the repair lead, such that the two adjacent touch electrodes are used as a whole to perform display and touch, thereby extending the service life of the display device. In order to achieve the above object, following technical solutions are provided in the embodiments. The technical solutions provided in the embodiments are described in detail in conjunction with FIGS. 2 to 6.

Figure 2:
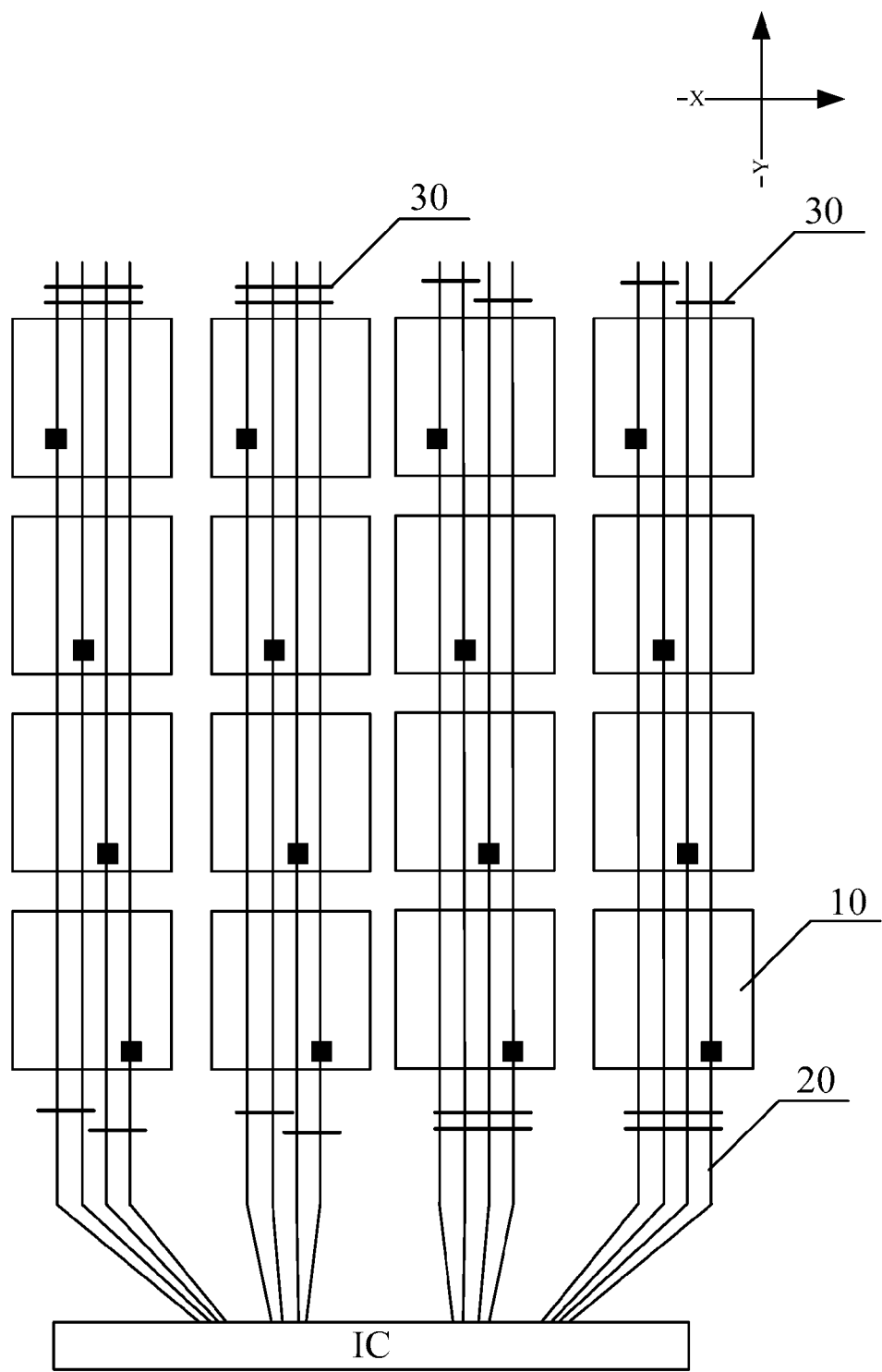
FIG. 2 is a schematic structural diagram of an array substrate according to an embodiment.

Reference is made to FIG. 2, which is a schematic structural diagram of an array substrate according to an embodiment. The array substrate in this embodiment includes multiple touch electrodes 10 arranged in an array, where the multiple touch electrodes 10 include multiple touch electrode columns arranged in a first direction X and multiple touch electrode rows arranged in a second direction Y The array substrate in this embodiment also includes multiple touch leads 20, where each of the multiple leads 20 is electrically connected to one of the multiple touch electrodes 10. The array substrate in this embodiment still includes multiple repair leads 30, where an insulation overlapped region is provided between each of two of the multiple touch leads 20 corresponding to two adjacent ones of the multiple touch electrodes 10 arranged in the first direction X or the second direction Y and at least one of the multiple repair leads 30.

It can be seen that, multiple repair leads are provided on the array substrate. When a fault occurs in any touch lead, the touch electrode connected to the touch lead in the fault state is electrically connected to the adjacent touch electrode thereof via the repair lead, so that the two adjacent touch electrodes are connected as a repair touch electrode. The electrical connection between the touch lead and the repair lead may be implemented by laser irradiating to weld and connect the touch lead and the repair lead. The repair touch electrode is provided with a corresponding display signal during a display phase of the display device. During a touch phase of the display device, with a method for determining touch center coordinates provided in the following embodiments, touch center coordinates of the repair touch electrode are calculated, thereby guaranteeing normal use of the display device and extending the service life of the display device.

It should be noted that, the touch electrode provided in the embodiment may be formed by dividing the common electrode layer of the array substrate or may be fabricated from a single conductive layer. These however are not intended to be limiting. In the array substrate provided in the embodiment, a conductive layer where the repair leads are located may be different from a conductive layer where the touch leads are located. Alternatively, the conductive layer where the repair leads are located may be the same as the conductive layer where the touch leads are located, and an insulation layer is provided between an overlapped region between the repair leads and the touch leads, so as to avoid short-circuit caused by direct touch between the touch leads and the repair leads.

Further, the repair lead provided in the embodiment may be a straight segment, an arc or a segment with another shape. This however is not intended to be limiting. The shape and position of the repair lead may be designed as required in the actual application in conjunction with factors such as light transmittance and a layout area of the display device. Furthermore, for the repair lead provided in the embodiment, in addition to the insulation overlapped region between the repair lead and the touch lead corresponding to the two adjacent touch electrodes, an insulation overlapped region may be provided between the repair lead and other touch leads, which is not limited in the embodiment and may be designed as required in the actual application.

Furthermore, for avoiding the following situation: when a fault occurs in the touch lead, the touch electrode connected to the touch lead in the fault state cannot be electrically connected to the adjacent touch electrode since the repair lead is located between the drive IC and the fault point, an insulation overlapped region can be provided between each of the two touch leads corresponding to the two adjacent touch electrodes and each of at least two repair leads in the embodiment.

The two touch leads corresponding to the two adjacent touch electrodes have same extension directions, and the at least two repair leads are arranged in the extension direction.

Multiple repair leads are provided to be insulated from and overlap with touch leads corresponding to the two adjacent touch electrodes, such that the two adjacent touch electrodes are electrically connected via another repair lead when the two adjacent touch electrodes cannot be connected via one or more of the repair leads. Since the multiple repair leads are arranged in the extension direction of the touch lead, the above situation that repair effect cannot be achieved due to concentrated arrangement of the repair leads can be avoided.

In addition to providing multiple repair leads, the repair lead may be provided at each of two ends of each of the two touch leads corresponding to the two adjacent touch electrodes in an embodiment, in order to avoid that once a fault occurs in the touch lead, the touch electrode connected to the touch lead in the fault state cannot be electrically connected to the adjacent touch electrode since the repair lead is located between the drive IC and a fault point.

The repair leads provided in the embodiment may be located in any part of a display region of the array substrate. Furthermore, in the array substrate provided in an embodiment, the touch leads extend to a border region of the array substrate and the repair leads are located in the border region, in order to avoid influencing the light transmittance of the display device.

When the multiple repair leads are located in the display region of the array substrate in the embodiment, the repair leads may be located in a gap between multiple pixel units to avoid influencing the light transmittance of the display device by the repair leads. That is, the array substrate includes multiple pixel unit columns arranged in the first direction and multiple pixel unit rows arranged in the second direction.

The repair lead is located between two adjacent pixel unit columns and/or two adjacent pixel unit rows.

Furthermore, in one embodiment, the array substrate includes a bearing substrate, and the touch leads, the repair leads and the touch electrodes are located on a same side of the bearing substrate, thereby ensuring that the repair is performed simply and conveniently.

The touch leads are located on a first conductive layer, the repair leads are located on a second conductive layer, and the touch electrodes are located on a third conductive layer, each of the first and second conductive layers being located on a side of the third conductive layer facing away from the bearing substrate. That is, the touch leads and the repair leads each are arranged on an outer layer of the array substrate, so as to avoid that the connection between the repair leads and the touch leads can only be implemented by passing through multiple layers, thereby ensuring that the repair is performed simply and conveniently.

It should be noted that, the repair leads may be provided in the display region or the border region of the array substrate, which is not intended to be limiting and may be designed as required in the actual application. In addition, positional relationship between the repair leads and the touch leads on the array substrate is not limited to the embodiments described in the present disclosure and may be designed as required in the actual application.

Figure 3:
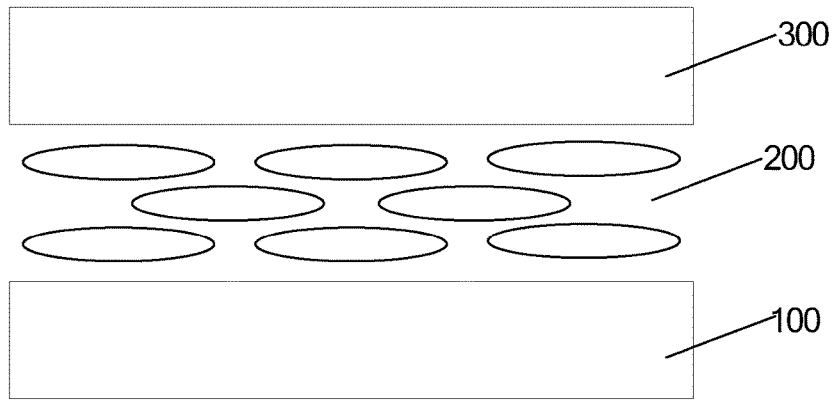
FIG. 3 is a schematic structural diagram of a display panel according to an embodiment.

Accordingly, a display panel is further provided in an embodiment. Reference is made to FIG. 3, which is a schematic structural diagram of a display panel according to an embodiment. The display panel includes the array substrate 100 according to any one of the above embodiments.

The display panel provided in the embodiment may be a liquid crystal display panel, and the display panel further includes a liquid crystal layer 200; and a color film substrate 300 located on a side of the liquid crystal layer 200 facing away from the array substrate 100.

It should be noted that, the display panel provided in the embodiment may be a display panel of another type, which is not limited in the embodiment.

Figure 4:
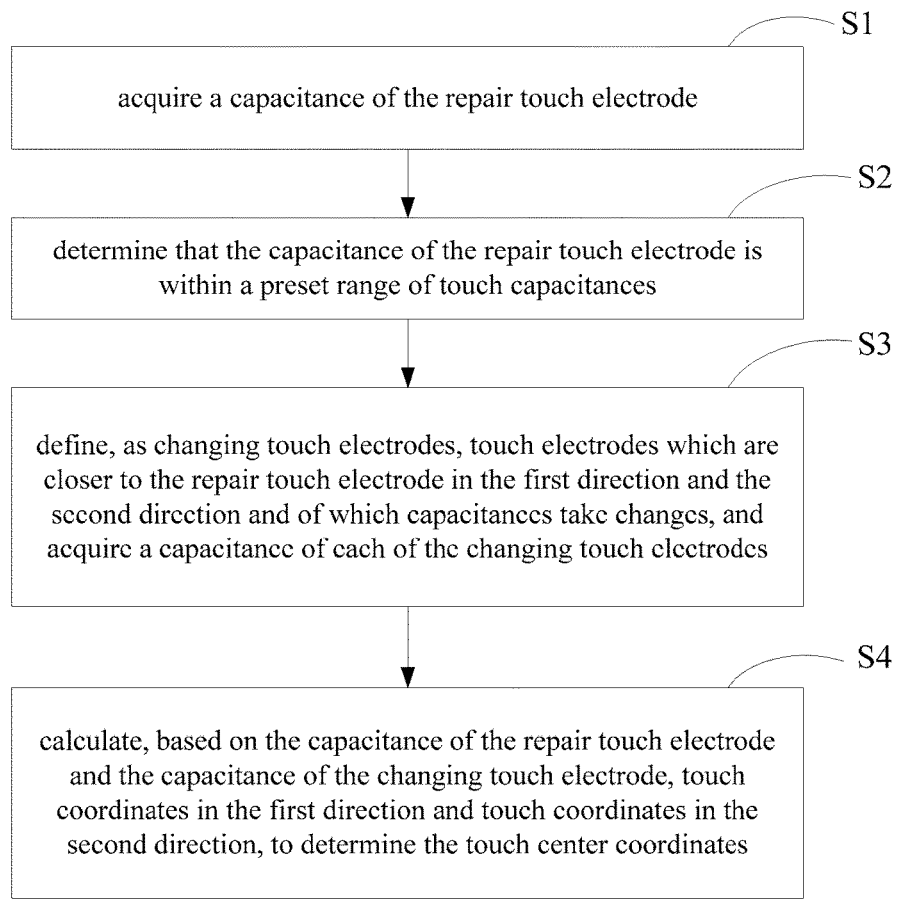
FIG. 4 is a flowchart of a method for determining touch center coordinates according to an embodiment.
Figure 5A:
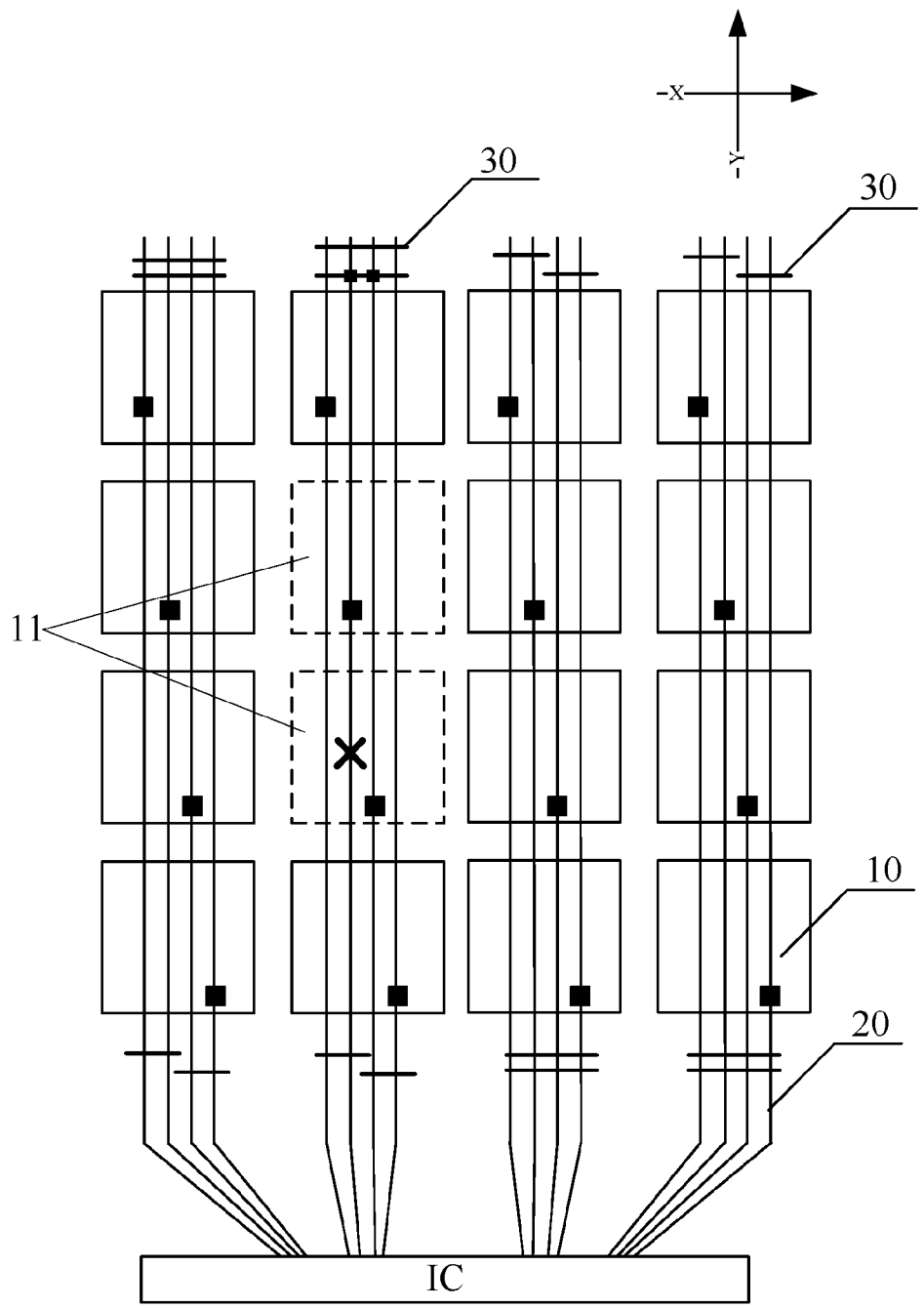
FIG. 5a is a schematic diagram of a touch structure of a display panel according to an embodiment.
Figure 5B:
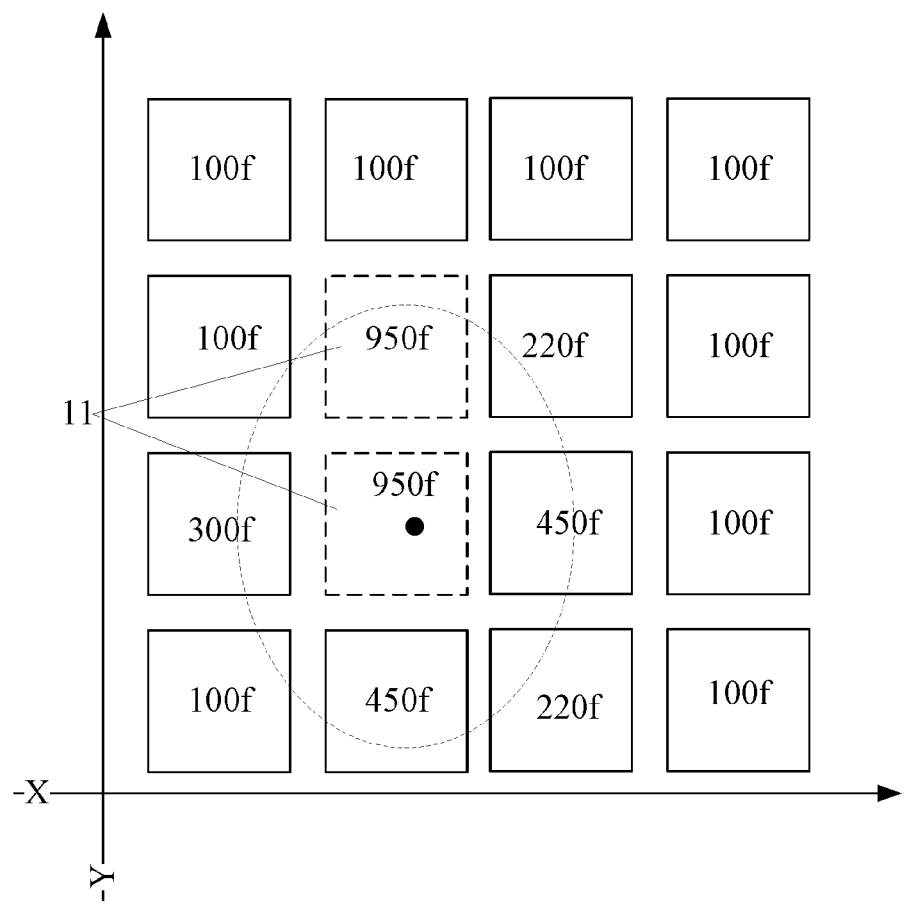

Corresponding to the display panel provided according to the above embodiment, a method for determining touch center coordinates is further provided in an embodiment, which is applicable to the display panel provided according to the above embodiments. Referring to FIGS. 4, 5a and 5b, FIG. 4 is a flowchart of a method for determining touch center coordinates according to an embodiment, FIG. 5a is a schematic diagram of a touch structure of a display panel according to an embodiment, and FIG. 5b is a distribution diagram of capacitances of all touch electrodes in the touch structure of the display panel shown in FIG. 5a. When a fault occurs in a touch lead corresponding to any one of two adjacent touch electrodes 10 in the display panel, each of two touch leads 20 corresponding to the two adjacent touch electrodes is electrically connected to corresponding repair leads 30. The two adjacent touch electrodes are defined as a repair touch electrode 11. The method for determining touch center coordinates includes step S1 to step S4.

In step S1, a capacitance of the repair touch electrode is acquired.

In step S2, it is determined that the capacitance of the repair touch electrode is within a preset range of touch capacitances.

In step S3, touch electrodes which are closer to the repair touch electrode in the first direction and the second direction and of which capacitances take changes are defined as changing touch electrodes, and a capacitance of each of the changing touch electrodes is acquired.

In step S4, touch coordinates in the first direction and touch coordinates in the second direction are calculated based on the capacitance of the repair touch electrode and the capacitance of the changing touch electrode, to determine the touch center coordinates.

Specifically, as shown in FIG. 5a, description is given by taking 16 touch electrodes 10 as an example. In FIG. 5a, all the touch electrodes are grouped into four touch electrode columns in a first direction X and grouped into four touch electrode rows in a second direction Y. Generally, each of the touch electrodes is a rectangular or square block electrode, and the touch electrodes have a same size. It is assumed that a capacitance of each touch electrode itself is 100 f, and a maximum increased capacitance is 400 f when the touch electrode is completely touched by a finger. When disconnection occurs in a touch lead 20 (for example at a position indicated by "X" in FIG. 5*a*), a touch electrode connected to the touch lead in the fault state is electrically connected to an adjacent touch electrode thereof in the second direction via the repair lead 30 by laser welding, to serve as a repair touch electrode 11.

Two touch electrodes for forming the repair touch electrode 11 can have a same capacitance when the repair touch electrode 11 is touched by a finger. Assumed that, it is determined that the repair touch electrode is touched by the finger when a capacitance of the repair touch electrode is 950 f. When it is determined that the repair touch electrode is touched in accordance with the above rule, touch electrodes which are closer to the repair touch electrode 11 in the first direction X and the second direction Y and of which capacitances take changes are defined as changing touch electrodes, and a capacitance of each of the changing touch electrode is acquired (each touch electrode is indicated by coordinates, where the touch electrode in the first direction X is indicated as X1Y2=300 f, X3Y3=220 f and X3Y2=450 f, and the touch electrode in the second direction Y is indicated as X2Y1=450 f). Finally, the touch coordinates in the first direction and the touch coordinates in the second direction are calculated based on the capacitance of the repair touch electrode and the capacitance of each of the changing touch electrode in combination with other parameters, to determine the touch center coordinates.

It should be noted that, the above-mentioned other parameters adopted in calculating the touch center coordinates are not limited in the embodiment and are selected as required in the actual application.

In some embodiments, in a specific implementation of the present disclosure, step S4 can include steps of S41 and S42.

In step S41, a touch electrode row where a changing touch electrode of which a capacitance changes most in the first direction is located is defined as a changing touch electrode row, and a capacitance of each of the changing touch electrodes in the changing touch electrode row is acquired; and a touch electrode column where a changing touch electrode of which a capacitance changes most in the second direction is located is defined as a changing touch electrode column, and a capacitance of each of the changing touch electrodes in the changing touch electrode column is acquired.

In step S42, touch coordinates in the first direction are calculated according to equation (1):

$$D1=[1-(F1-K)/M]*A1+[(F1-K)/M+(F2-K)/M+\ldots+(Fn-K)/M+(F\max-M)/2*M+(F\max-K)/2*M]*A1/2+S1, \quad \text{(equation 1)}$$

touch coordinates in the second direction are calculated according to equation (2) to determine the touch center coordinates (D1, D2):

$$D2=[1-(F1'-K)/M]*A2+[(F1'-K)/M+(F2'-K)/M+\ldots+(Fn'-K)/M+(F\max-M)/2*M+(F\max-K)/2*M]*A2/2+S2, \quad \text{(equation 2)}$$

When the repair touch electrode is composed of two touch electrodes arranged in the first direction, a value of (Fmax−K)/2*M in equation (2) is 0. Alternatively, when the repair touch electrode includes two touch electrodes arranged in the second direction, a value of (Fmax−K)/2*M in equation (1) is 0.

Where K indicates a capacitance of the touch electrode itself, M indicates a maximum increased capacitance in a case that the touch electrode is completely touched by a finger, Fmax indicates a capacitance of the repair touch electrode, D1 indicates touch coordinates in the first direction, A1 indicates a side length of the touch electrode in the first direction, F1, F2, . . . , Fn indicate a capacitance of each of the changing touch electrodes arranged in the first direction in the changing touch electrode row respectively, and S1 indicates a total side length of all the touch electrodes in the first direction which are located on a side of a changing touch electrode in the changing touch electrode row, which has a capacitance F1, facing away from the repair touch electrode.

Where D2 indicates touch coordinates in the second direction, A2 indicates a side length of the touch electrode in the second direction, F1', F2', . . . , Fn' indicate a capacitance of each of the changing touch electrodes arranged in the second direction in the changing touch electrode column respectively, and S2 indicates a total side length of all the touch electrodes in the second direction which are located on a side of a changing touch electrode in the changing touch electrode column, which has a capacitance F1', facing away from the repair touch electrode.

Touch center coordinates are calculated according to the above equations in conjunction with the capacitance distribution diagram as shown in FIG. 5*b*. It is defined that each of the touch electrodes is a square touch electrode, and a side length of each touch electrode is 0.5 mm, i.e., A1 and A2 each are 0.5 mm. In a case that the repair touch electrode 11 is composed of two touch electrodes arranged in the second direction, a value of (Fmax−K)/2*M in equation (1) is 0. A capacitance K of the touch electrode itself is 100 f, a maximum increased capacitance M is 400 f when the touch electrode is completely touched by a finger, and a capacitance Fmax of the repair touch electrode 11 is 950 f.

First, it can be seen from FIG. 5*b* that, the changing touch electrode row is a touch electrode row corresponding to Y2. If F1=300 f and F2=450 f, then S1=0. The changing touch electrode column is a touch electrode column corresponding to X2. If F1'=450 f, then S2=0.

Second, it is calculated according to equation (1), $$D1 = [1 - (F1 - K)/M] * A1 + [(F1 - K)/M + \quad \text{(equation 1)}$$
$$(F2 - K)/M + \ldots + (Fn - K)/M +$$
$$(F\max - M)/2 * M + (F\max - K)/2 * M] *$$
$$A1/2 + S1$$
$$= [1 - (300 - 100)/400] * 0.5 + [(300 - 100)/$$
$$400 + (450 - 100)/400 + (950 - 400)/2 *$$
$$400 + 0] * 0.5/2 + 0$$
$$= 0.765625 \text{ mm,}$$

that is, coordinates in the first direction is 0.765625 mm; and it is calculated according to equation (2), $$D2 = [1 - F1' - K)/M] * A2 + [(F1' - K)/M + \quad \text{(equation 2)}$$
$$(F2' - K)/M + \ldots + (Fn' - K)/M +$$

-continued $$(F\max - M)/2 * M + (F\max - K)/2 * M] *$$
$$A2/2 + S2$$
$$= [1 - (450 - 100)/400] * 0.5 + [(450 - 100)/$$
$$400 + (950 - 400)/2 * 400 + (950 - 100)/2 *$$
$$400] * 0.5/2 + 0$$
$$= 0.71875 \text{ mm},$$

that is, coordinates in the second direction is 0.71875 mm. Hence the touch center coordinates are (0.765625, 0.71875).

It should be noted that, the values of the touch center coordinates may be expressed as values having two or other decimal places, which is not limited to the embodiments described in the present disclosure and may be selected according to parameters such as an actual size of the touch electrode.

Figure 6:
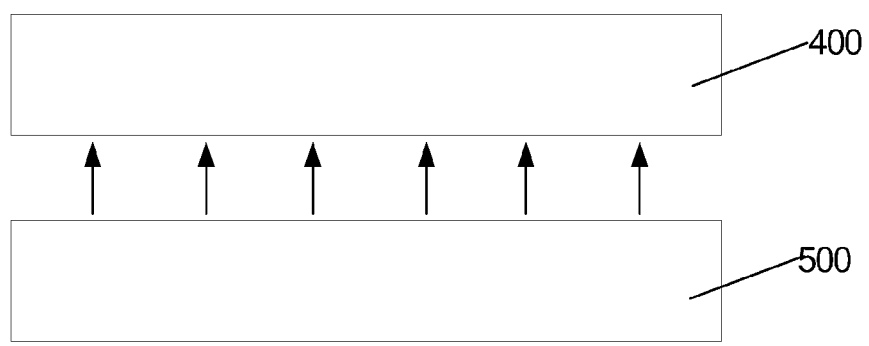
FIG. 6 is a schematic structural diagram of a display device according to an embodiment.

Accordingly, a display device is further provided according to an embodiment. Reference is made to FIG. 6, which is a schematic structural diagram of a display device according to an embodiment. The display device includes the display panel 400 according to the above embodiment.

When the display device is a liquid crystal display device, the display device further includes a backlight module 500 providing a backlight (backlight rays shown by arrows in FIG. 6) for the display panel 400.

An array substrate, a display panel, a method for determining touch center coordinates and a display device are provided in the embodiments. The array substrate includes: multiple touch electrodes arranged in an array, where the multiple touch electrodes include multiple touch electrode columns arranged in a first direction and multiple touch electrode rows arranged in a second direction; multiple touch leads, where each of the multiple touch leads is electrically connected to one of the multiple of touch electrodes; and multiple repair leads, where an insulation overlapped region is provided between each of two of the multiple touch leads corresponding to two adjacent ones of the multiple touch electrodes arranged in the first direction or the second direction and at least one of the multiple repair leads.

It can be seen from above that, with the technical solutions provided in the embodiments, multiple repair leads are provided on the array substrate. When a fault occurs in any touch lead, a touch electrode connected to the touch lead in a fault state is electrically connected to an adjacent touch electrode thereof via the repair lead, such that the two adjacent touch electrodes are connected as a repair touch electrode. The repair touch electrode is provided with a corresponding display signal during a display phase of the display device. During a touch phase of the display device, the touch center coordinates of the repair touch electrode are calculated with the method for determining touch center coordinates provided in the embodiments, thereby guaranteeing normal use of the display device and extending the service life of the display device.

With the above description of the disclosed embodiments, those skilled in the art can implement or practice the present disclosure. Various modifications to these embodiments are apparent to those skilled in the art, and general principles defined herein can be implemented in other embodiments without departing from the spirit or scope of the disclosure. Hence, the present disclosure is not limited to the embodiments disclosed herein, but is to conform to the widest scope in accordance with the principles and novel features disclosed herein.

The invention claimed is:

1. An array substrate, comprising:
a plurality of touch electrodes arranged in an array, wherein the plurality of touch electrodes comprise a plurality of touch electrode columns arranged in a first direction and a plurality of touch electrode rows arranged in a second direction;
a plurality of touch leads, wherein each touch lead of the plurality of touch leads is electrically connected to one touch electrode of the plurality of touch electrodes; and
a plurality of repair leads, wherein an insulation overlapped region is provided between each of two touch leads of the plurality of touch leads corresponding to two adjacent touch electrodes of the plurality of touch electrodes arranged in the second direction and at least one repair lead of the plurality of repair leads, a plurality of repair leads corresponding to one touch electrode column of the plurality of touch electrode columns comprises a first repair lead and a second repair lead, the first repair lead overlaps only two touch leads of the plurality of touch leads connected to two adjacent touch electrodes of the plurality of touch electrodes corresponding to the one touch electrode column of the plurality of touch electrode columns, and the second repair lead overlaps all touch leads of the plurality of touch leads connected to touch electrodes of the plurality of touch electrodes corresponding to the one touch electrode column of the plurality of touch electrode columns;
wherein a repair lead of the plurality of repair leads corresponding to the one touch electrode column is electrically connected to two touch leads of the plurality of touch leads corresponding to two neighboring touch electrodes in the one touch electrode column when a fault occurs in a touch lead of the plurality of touch leads corresponding to a touch electrode of the two neighboring touch electrodes.

2. The array substrate according to claim 1, wherein a repair lead of the plurality of repair leads corresponding to the one touch electrode column is provided at each of two ends of each of two touch leads of the plurality of touch leads corresponding to two adjacent touch electrodes.

3. The array substrate according to claim 1, wherein the plurality of touch leads extend to a border region of the array substrate, and the plurality of repair leads are located in the border region.

4. The array substrate according to claim 1, wherein the plurality of repair leads are located in a display region of the array substrate.

5. The array substrate according to claim 4, comprising a plurality of pixel unit columns arranged in the first direction and a plurality of pixel unit rows arranged in the second direction; and, wherein
the at least one repair lead is located between at least one of two adjacent pixel unit columns and two adjacent pixel unit rows.

6. The array substrate according to claim 4, comprising a bearing substrate, wherein the plurality of touch leads, the plurality of repair leads and the plurality of touch electrodes are located on a same side of the bearing substrate; and, wherein
the plurality of touch leads are located on a first conductive layer, the plurality of repair leads are located on a second conductive layer, and the plurality of touch electrodes are located on a third conductive layer, each of the first conductive layer and the second conductive layer being located on a side of the third conductive layer facing away from the bearing substrate.

7. A display panel, comprising:

a plurality of touch electrodes arranged in an array, wherein the plurality of touch electrodes comprise a plurality of touch electrode columns arranged in a first direction and a plurality of touch electrode rows arranged in a second direction;

a plurality of touch leads, wherein each touch lead of the plurality of touch leads is electrically connected to one touch electrode of the plurality of touch electrodes; and a plurality of repair leads, wherein an insulation overlapped region is provided between each of two touch leads of the plurality of touch leads corresponding to two adjacent touch electrodes of the plurality of touch electrodes arranged in the second direction and at least one repair lead of the plurality of repair leads, a plurality of repair leads corresponding to one touch electrode column of the plurality of touch electrode columns comprises a first repair lead and a second repair lead, the first repair lead overlaps only two touch leads of the plurality of touch leads connected to two adjacent touch electrodes of the plurality of touch electrodes corresponding to the one touch electrode column of the plurality of touch electrode columns, and the second repair lead overlaps all touch leads of the plurality of touch leads connected to touch electrodes of the plurality of touch electrodes corresponding to the one touch electrode column of the plurality of touch electrode columns;

wherein a repair lead of the plurality of repair leads corresponding to the one touch electrode column is electrically connected to two touch leads of the plurality of touch leads corresponding to two neighboring touch electrodes in the one touch electrode column when a fault occurs in a touch lead of the plurality of touch leads corresponding to a touch electrode of the two neighboring touch electrodes.

8. A method for determining touch center coordinates, applicable to a display panel comprising an array substrate, wherein the array substrate comprises:

a plurality of touch electrodes arranged in an array, wherein the plurality of touch electrodes comprise a plurality of touch electrode columns arranged in a first direction and a plurality of touch electrode rows arranged in a second direction;

a plurality of touch leads, wherein each touch lead of the plurality of touch leads is electrically connected to one touch electrode of the plurality of touch electrodes; and a plurality of repair leads, wherein an insulation overlapped region is provided between each of two touch leads of the plurality of touch leads corresponding to two adjacent touch electrodes of the plurality of touch electrodes arranged in the second direction and at least one repair lead of the plurality of repair leads, wherein when a fault occurs in a touch lead corresponding to a touch electrode of the two adjacent touch electrodes in the display panel, each touch lead of two touch leads corresponding to the two adjacent touch electrodes is electrically connected to a repair lead of the at least one repair lead, with the two adjacent touch electrodes being defined as a repair touch electrode, and wherein the method comprises:

acquiring a capacitance of the repair touch electrode;

determining that the capacitance of the repair touch electrode is within a preset range of touch capacitances;

defining, as changing touch electrodes, touch electrodes which are closer to the repair touch electrode in the first direction and the second direction and of which capacitances take changes, and acquiring a capacitance of each changing touch electrode of the changing touch electrodes; and calculating, based on the capacitance of the repair touch electrode and the capacitance of the changing touch electrode, a touch coordinate in the first direction and a touch coordinate in the second direction, to determine the touch center coordinates.

9. The method according to claim 8, wherein the calculating of the touch coordinate in the first direction and the touch coordinate in the second direction comprises:

defining, as a changing touch electrode row, a touch electrode row where a changing touch electrode of which a capacitance changes most in the first direction is located;

acquiring a capacitance of each changing touch electrode of the changing touch electrodes in the changing touch electrode row;

defining, as a changing touch electrode column, a touch electrode column where a changing touch electrode of which a capacitance changes most in the second direction is located;

acquiring a capacitance of each changing touch electrode of the changing touch electrodes in the changing touch electrode column; and calculating the touch coordinate in the first direction according to equation (1):

$$D1=[1-(F1-K)/M]*A1+[(F1-K)/M+(F2-K)/M+ \ldots +(Fn-K)/M+(Fmax-M)/2*M+(Fmax-K)/2*M]*A1/2+S1, \quad \text{equation (1)}$$

calculating the touch coordinate in the second direction according to equation (2) to determine the touch center coordinates (D1, D2), $$D2=[1-(F1'-K)/M]*A2+[(F1'-K)/M+(F2'-K)/M+ \ldots +(Fn'-K)/M+(Fmax-M)/2*M+(Fmax-K)/2*M]*A2/2+S2, \quad \text{equation (2)}$$

wherein a value of (Fmax−K)/2*M in equation (2) is 0 in a case that the repair touch electrode is composed of two touch electrodes arranged in the first direction, or a value of (Fmax−K)/2*M in equation (1) is 0 in a case that the repair touch electrode is composed of two touch electrodes arranged in the second direction;

wherein K indicates a capacitance of each touch electrode itself of the plurality of touch electrodes, M indicates a maximum increased capacitance in a case that a touch electrode of the plurality of touch electrodes is completely touched by a finger, Fmax indicates a capacitance of the repair touch electrode, D1 indicates the touch coordinate in the first direction, A1 indicates a side length of each touch electrode of the plurality of touch electrodes in the first direction, F1, F2, . . . ,Fn indicate a capacitance of each changing touch electrode of the changing touch electrodes arranged in the first direction in the changing touch electrode row respectively, and S1 indicates a total side length of all touch electrodes of the plurality of touch electrodes arranged in the first direction which are located on a side of a changing touch electrode in the changing touch electrode row, which has a capacitance F1, facing away from the repair touch electrode; and wherein D2 indicates the touch coordinate in the second direction, A2 indicates a side length of each touch electrode of the plurality of touch electrodes in the second direction, $F1'$, $F2'$, ..., $Fn'$ indicate a capacitance of each changing touch electrode of the changing touch electrodes arranged in the second direction in the changing touch electrode column respectively, and S2 indicates a total side length of all touch electrodes of the plurality of touch electrodes arranged in the second direction which are located on a side of a changing touch electrode in the changing touch electrode column, which has a capacitance $F1'$, facing away from the repair touch electrode.

\* \* \* \* \*